(12) United States Patent
Matsumoto et al.

(10) Patent No.: US 8,531,556 B2
(45) Date of Patent: Sep. 10, 2013

(54) IMAGING APPARATUS AND RECORDING MEDIUM WITH PROGRAM RECORDED THEREIN

(75) Inventors: Kosuke Matsumoto, Akishima (JP); Naotomo Miyamoto, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 188 days.

(21) Appl. No.: 13/076,708

(22) Filed: Mar. 31, 2011

(65) Prior Publication Data

US 2011/0242354 A1  Oct. 6, 2011

(30) Foreign Application Priority Data

Mar. 31, 2010 (JP) ................. 2010-080469

(51) Int. Cl.
*H04N 5/262* (2006.01)
*H04N 5/225* (2006.01)

(52) U.S. Cl.
USPC ....................... 348/239; 348/218.1

(58) Field of Classification Search
USPC ............. 348/220.1, 218.1, 239; 382/282
See application file for complete search history.

(56) References Cited

U.S. PATENT DOCUMENTS

| 8,116,535 | B2 | 2/2012 | Nozawa | |
| 2008/0253687 | A1* | 10/2008 | Zhang et al. | 382/284 |
| 2009/0290013 | A1* | 11/2009 | Hayashi | 348/36 |
| 2010/0214445 | A1* | 8/2010 | Chronqvist | 348/231.99 |

FOREIGN PATENT DOCUMENTS

| CN | 101132480 A | | 2/2008 |
| JP | 2002-027312 A | | 1/2002 |
| JP | 2004-096156 | * | 3/2004 |
| JP | 2004-096156 A | | 3/2004 |

OTHER PUBLICATIONS

Japanese Office Action dated Jan. 25, 2012 (and English translation thereof) in counterpart Japanese Application No. 2010-080469.
Chinese Office Action dated Dec. 19, 2012 (and English translation thereof), issued in counterpart Chinese Application No. 201110159510.X.

* cited by examiner

*Primary Examiner* — Lin Ye
*Assistant Examiner* — Euel Cowan
(74) *Attorney, Agent, or Firm* — Holtz, Holtz, Goodman & Chick, PC

(57) ABSTRACT

An imaging apparatus including a capturing section which captures an image at a first viewing angle, a capturing control section which performs a plurality of image capturing operations by the capturing section, a generation section which generates a composite image reproducing an image captured at a second viewing angle that is wider than the first viewing angle by combining a plurality of images acquired by the plurality of image capturing operations by the capturing control section, a judgment section which judges whether or not an uncaptured area that has not been captured by the capturing control section exists within the composite image with the second viewing angle generated by the generation section, and a notification section which notifies a user of a judgment result, when the judgment section judges that an uncaptured area exists.

5 Claims, 7 Drawing Sheets

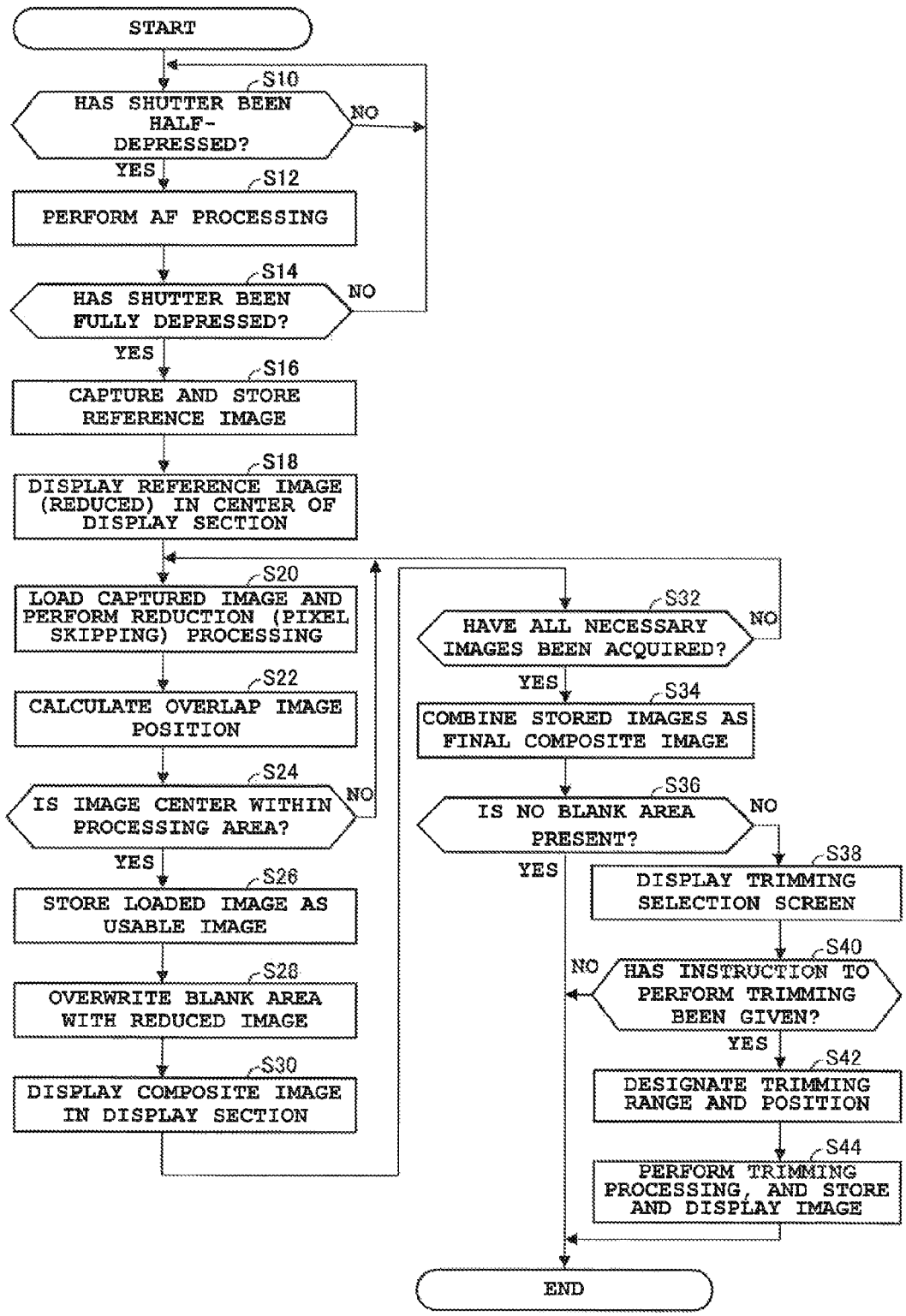

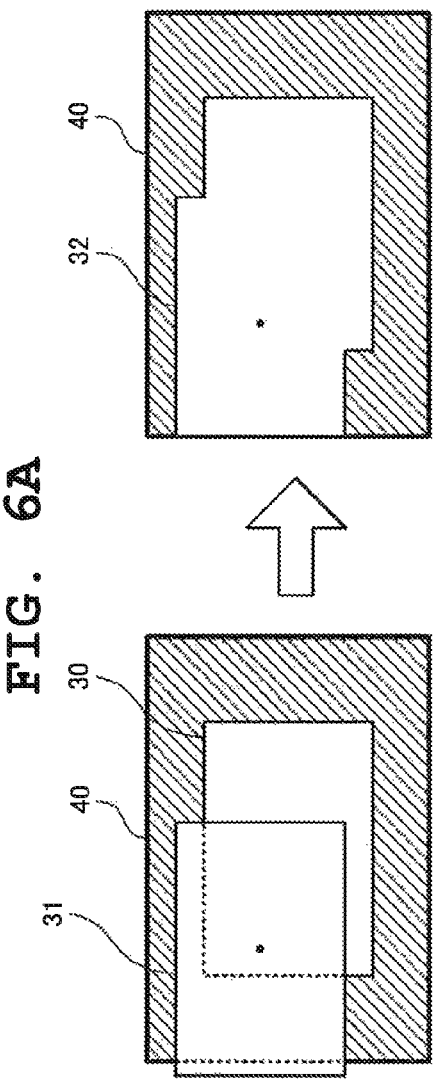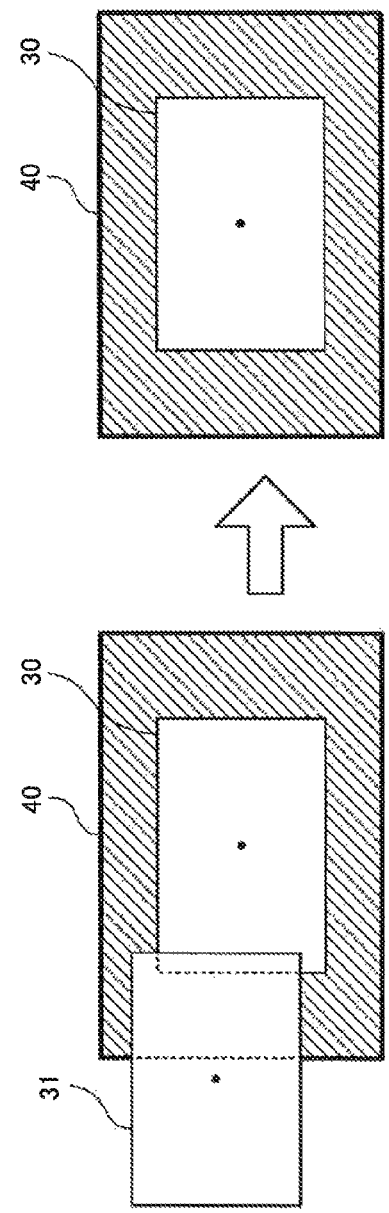

IMAGING APPARATUS AND RECORDING MEDIUM WITH PROGRAM RECORDED THEREIN

CROSS-REFERENCE TO RELATED APPLICATION

This application is based upon and claims the benefit of priority from the prior Japanese Patent Application No. 2010-080469, filed Mar. 31, 2010, the entire contents of which is incorporated herein by reference.

BACKGROUND OF THE INVENTION

1. Field of the Invention

The present invention relates to an imaging apparatus and a recording medium with a program recorded therein.

2. Description of the Related Art

In digital cameras, mobile phones having an imaging function, etc., the limit of a viewing angle is dependent on the hardware specification of the device body, such as the focal distance of the lens, the size of the image sensor, and the like.

Therefore, a technique is known that, when acquiring a wide-angle image that exceeds a hardware specification, such as when performing panoramic imaging, consecutively captures images while moving the imaging apparatus in a one-dimensional direction, and generates a panoramic image by combining the acquired plurality of images (refer to, for example, Japanese Patent Application Laid-Open (Kokai) Publication No. 2002-027312).

The above-described conventional technology is effective for when the user captures images by moving the imaging apparatus in a one-dimensional direction. In addition, the image capturing method therefore is comparatively simple. If an image capturing method such as this is expanded to two-dimensional directions, a composite image such as that acquired at a wide viewing angle may be generated.

However, in the above-described imaging-capturing method, if images are consecutively captured while the imaging apparatus is being moved in two-dimensional directions by user operation, some of necessary images may not be captured, and in this case, an image-composition result indicating the lack of necessary images is obtained. Accordingly, there is a problem in the conventional technology in that, when a satisfactory image with a wide viewing angle is not acquired by image composition, the user is required to retry consecutive image capturing from the start.

SUMMARY OF THE INVENTION

An object of the present invention is to provide an imaging apparatus and a recording medium with a program stored therein by which a desired image with a wide viewing angle can be easily acquired.

In order to achieve the above-described object, in accordance with one aspect of the present invention, there is provided an imaging apparatus comprising: a capturing section which captures an image at a first viewing angle; a capturing control section which performs a plurality of image capturing operations by the capturing section; a generation section which generates a composite image reproducing an image captured at a second viewing angle that is wider than the first viewing angle by combining a plurality of images acquired by the plurality of image capturing operations by the capturing control section; a judgment section which judges whether or not an uncaptured area that has not been captured by the capturing control section exists within the composite image with the second viewing angle generated by the generation section; and a notification section which notifies a user of a judgment result, when the judgment section judges that an uncaptured area exists.

In accordance with another aspect of the present invention, there is provided an imaging apparatus comprising: a capturing section which captures an image at a first viewing angle; a capturing control section which performs a plurality of image capturing operations by the capturing section; a generation section which generates a composite image reproducing an image captured at a second viewing angle that is wider than the first viewing angle by combining a plurality of images acquired by the plurality of image capturing operations by the capturing control section; a judgment section which judges whether or not an uncaptured area that has not been captured by the capturing control section exists within the composite image with the second viewing angle generated by the generation section; and a trimming section which trims an area that does not include the uncaptured area from the composite image, when the judgment section judges that an uncaptured area exists.

In accordance with another aspect of the present invention, there is provided a non-transitory computer-readable storage medium having stored thereon a program that is executable by a computer in an imaging apparatus including a capturing section which captures an image at a first viewing angle, the program being executable by the computer to perform functions comprising: capturing control processing for performing a plurality of image capturing operations by the capturing section; generation processing for generating a composite image reproducing an image captured at a second viewing angle that is wider than the first viewing angle by combining a plurality of images acquired by the plurality of image capturing operations performed in the capturing control processing; judgment processing for judging whether or not an uncaptured area that has not been captured in the capturing control processing exists within the composite image with the second viewing angle generated in the generation processing; and notification processing for notifying a user of a judgment result, when the judgment processing judges that an uncaptured area exists.

In accordance with another aspect of the present invention, there is provided a non-transitory computer-readable storage medium having stored thereon a program that is executable by a computer in an imaging apparatus including a capturing section which captures an image at a first viewing angle, the program being executable by the computer to perform functions comprising: capturing control processing for performing a plurality of image capturing operations by the capturing section; generation processing for generating a composite image reproducing an image captured at a second viewing angle that is wider than the first viewing angle by combining a plurality of images acquired by the plurality of image capturing operations performed in the capturing control processing; judgment processing for judging whether or not an uncaptured area that has not been captured in the capturing control processing exists within the composite image with the second viewing angle generated in the generation processing; and trimming processing for trimming an area that does not include the uncaptured area from the composite image, when the judgment processing judges that an uncaptured area exists.

The above and further objects and novel features of the present invention will more fully appear from the following detailed description when the same is read in conjunction with the accompanying drawings. It is to be expressly under-

BRIEF DESCRIPTION OF THE DRAWINGS

FIG. 5 is a flowchart for explaining operations of the digital camera according to the embodiment;

FIG. 6A and FIG. 6B are schematic diagrams for explaining image composition in the wide-angle imaging mode of the digital camera according to the embodiment.

DETAILED DESCRIPTION OF THE PREFERRED EMBODIMENTS

The preferred embodiments of the present invention will hereinafter be described with reference to the drawings. However, the scope of the invention is not limited to the illustrated examples.

A. Configuration of the Embodiment

Figure 1:
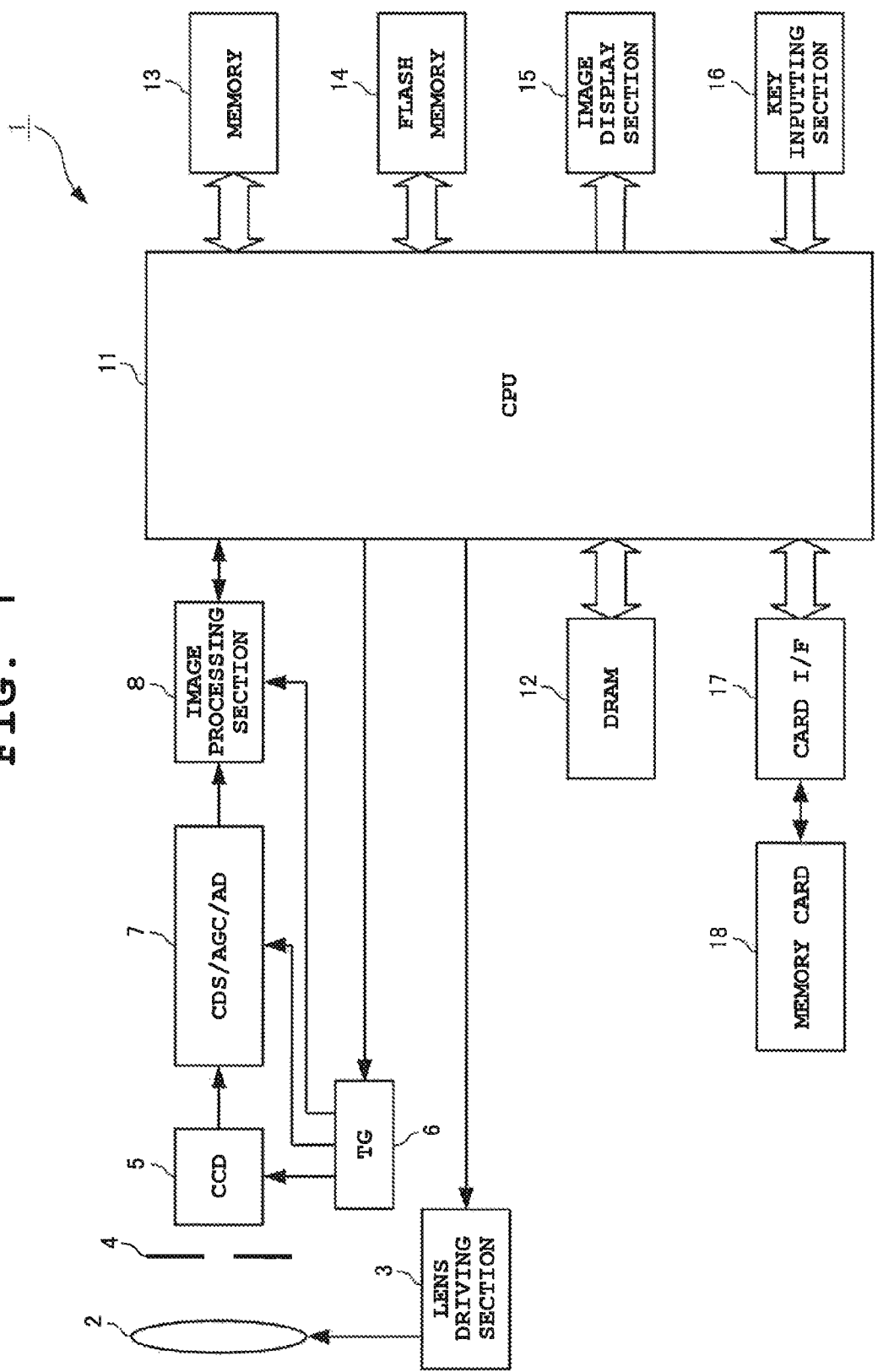
FIG. 1 is a block diagram showing the structure of a digital camera according to an embodiment of the present invention.

FIG. 1 is a block diagram showing the structure of a digital camera according to an embodiment of the present invention. In FIG. 1, a digital camera 1 includes an imaging lens 2, a lens driving section 3, a shutter-aperture 4, a charge-coupled device (CCD) 5, a timing generator (TG) 6, a unit circuit 7, an image processing section 8, a central processing unit (CPU) 11, a dynamic random access memory (DRAM) 12, a memory 13, a flash memory 14, an image display section 15, a key inputting section 16, a card interface (I/F) 17, and a memory card 18.

The imaging lens 2 includes a focus lens, a zoom lens, and the like, and is connected with the lens driving section 3. The lens driving section 3 includes a focus motor and a zoom motor that respectively drive the focus lens and the zoom lens constituting the imaging lens 2 in an optical axis direction, and a focus motor driver and a zoom motor driver that drive the focus motor and the zoom motor in accordance with control signals from the CPU 11.

The shutter-aperture 4 includes a driver circuit not shown, and the driver circuit operates the shutter-aperture 4 in accordance with control signals sent from the CPU 11. This shutter-aperture 4 controls the amount of light irradiated from the imaging lens 2. The CCD (image sensor) 5 (capturing section), which is driven in accordance with timing signals of a predetermined frequency generated by the TG 6, converts the light of a subject projected through the imaging lens 2 and the shutter-aperture 4 to electrical signals, and outputs them to the unit circuit 7 as imaging signals.

The unit circuit 7, which is also driven in accordance with timing signals of a predetermined frequency generated by the TG 6, includes a correlated double sampling (CDS) circuit that performs correlated double sampling on imaging signals outputted from the CCD 5 and holds the sampled imaging signals, an automatic gain control (AGC) circuit that performs automatic gain control on the sampled imaging signals, and an analog-to-digital (A/D) converter that converts the automatic-gain-controlled analog imaging signals to digital signals. Imaging signals outputted from the CCD 5 are sent to the image processing section 8 through this unit circuit 7, as digital signals.

The image processing section 8, which is also driven in accordance with timing signals of a predetermined frequency generated by the TG 6, performs image processing of image data sent from the unit circuit 7 (pixel interpolation processing, γ-correction, luminosity color difference signal generation, white balance processing, exposure correction processing, etc.), compression and extension processing of image data (such as compression and extension in Joint Photographic Experts Group (JPEG) format, Motion-JPEG [M-JPEG] format or Moving Picture Experts Group (MPEG) format), processing for combining a plurality of captured images, etc.

The CPU 11 (capturing control section, generation section, judgment section, notification section, trimming section, and specifying section) is a single-chip microcomputer that controls each section of the digital camera 1. In particular, according to the embodiment, the CPU 11 controls each section such that a plurality of images are consecutively captured at a predetermined cycle (time interval), the captured images are combined so that they are partially overlapped with each other (such as by α-blending), and a single composite image that appears to have been captured at a wide angle is generated. The details of this image composition will be described hereafter.

The DRAM 12 is used as a buffer memory that temporarily stores image data sent to the CPU 11 after being captured by the CCD 5, and as a working memory of the CPU 11. The memory 13 stores a program necessary for the CPU 11 to control each section of the digital camera 1 and data necessary to control each section, and the CPU 11 performs processing based on this program. The flash memory 14 and the memory card 18 are recording media that store image data captured by the CCD 5 and the like.

The image display section 15 includes a color liquid crystal display (LCD) and a driver circuit thereof. In an imaging stand-by state, the image display section 15 displays a subject captured by the CCD 5 as a through image. Also, the image display section 15 displays a recorded image that has been read out from the flash memory 14 or the memory card 23 and expanded when it is replayed. In addition, according to the embodiment, the image display section 15 in the wide-angle imaging mode displays a composite image generated by a plurality of consecutively captured images being sequentially combined. The key inputting section 16 includes a plurality of operation keys, such as a shutter switch (SW), a zoom SW, a mode key, a SET key, and a cross-shaped key, and outputs operation signals based on key operations by the user to the CPU 11. The memory card 18 is detachably mounted on the card I/F 17 by a card slot (not shown) in the main body of the digital camera 1.

Figure 2:
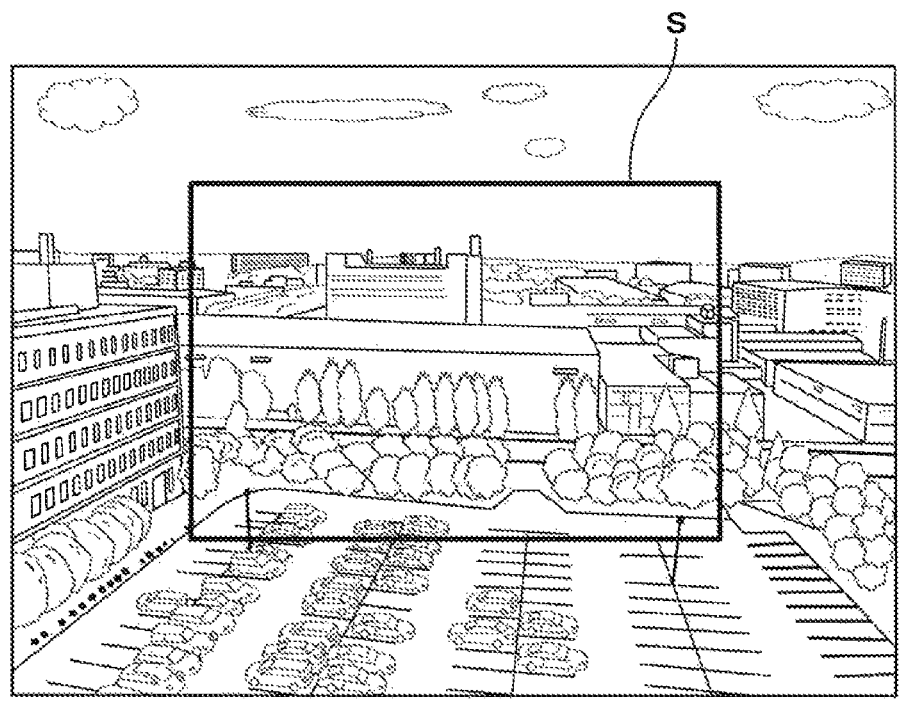
FIG. 2 is a conceptual diagram for explaining the wide-angle imaging mode of the digital camera according to the embodiment.

FIG. 2 is a conceptual diagram for explaining the wide-angle imaging mode of the digital camera 1 according to the embodiment. For example, suppose the case where a landscape such as that shown in FIG. 2 is to be captured by the digital camera 1. A viewing angle that is wider than a viewing angle S of the imaging system of the digital camera 1 is required to capture the landscape of the desired area. Accordingly, in this case, the entire desired landscape cannot be captured by a single shot.

In the embodiment, the wide-angle imaging mode is provided in which, while the user is moving the image capturing direction of the digital camera 1 to cover a desired landscape, a plurality of images are consecutively captured at a predetermined cycle (time interval) over a predetermined amount of time or for a predetermined number of images, and the captured images are combined so as to be partially overlapped with each other, whereby an image with a wide viewing angle can be easily acquired.

Figure 3:
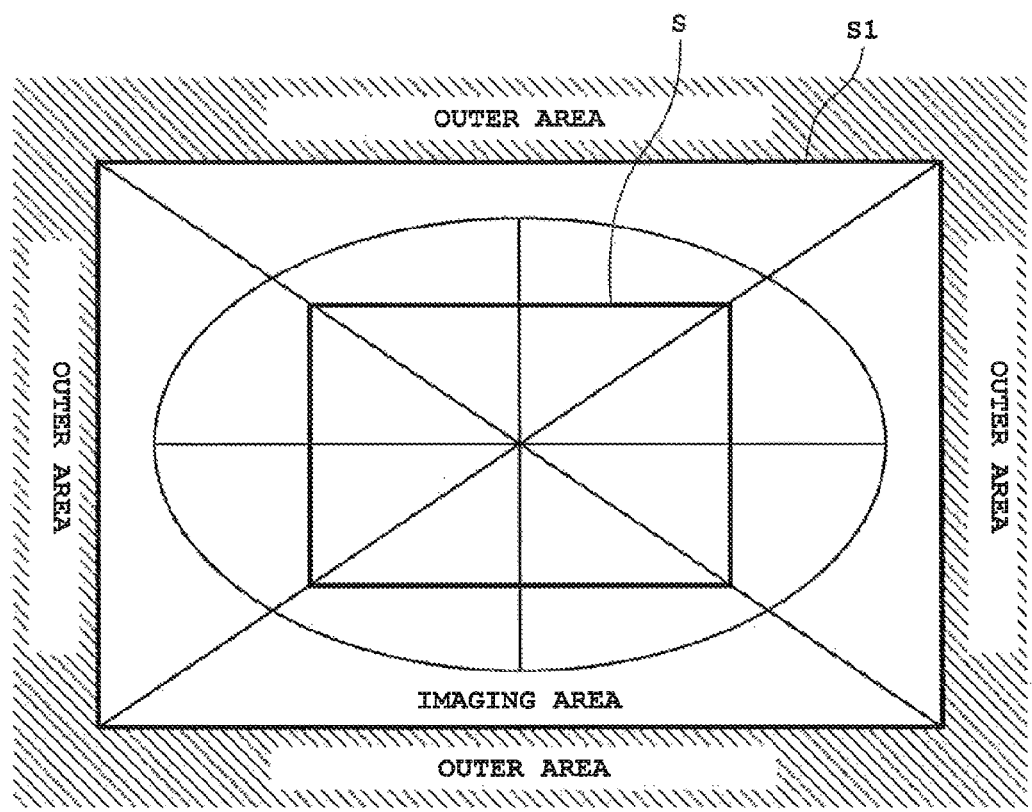
FIG. 3 is a conceptual diagram showing a relationship between the viewing angle of a lens and a composite image acquired in the wide-angle imaging mode in the digital camera according to the embodiment.

In the description below, the landscape shown in FIG. 2 will be described, being schematized as shown in FIG. 3 to clarify the imaging area, the viewing angle for imaging, etc. In FIG. 3, a viewing angle S1 is the size (viewing angle) of an image ultimately generated. Even if the outer side is captured, this outer area is not saved in the final image.

In the embodiment, an array for writing an image is secured in the memory (DRAM 12). This array is referred to as a canvas for convenience. The canvas indicates an imaging area that is reproduced by a generated composite image with a wide viewing angle. That is, a plurality of captured images that are positioned and combined so as to be partially overlapped with each other overwrite the canvas. Then, the area on the canvas in which the image has been written is extracted from the composite image, whereby an image with a wide viewing angle is generated.

In the embodiment, with a first image captured in the wide-angle imaging mode serving as a reference image (equivalent to the image at the viewing angle S in FIG. 3), an area that is, for example, twice the height and twice the width of the reference image is set as the canvas (the imaging area S1 in FIG. 3). Then, the reference image is pasted in the center of the canvas. Note that the size of the canvas may be other than twice the height and width. Also note that the reference image is not necessarily required to be placed in the center of the canvas and may, for example, be placed in the upper-left corner or the upper-right corner.

Next, a plurality of captured images are positioned so as to be partially overlapped with the reference image and combined. Then, the canvas is overwritten by the composite image. Further note that block matching, for example, can be used as a method for the positioning. In addition, a method can be used in which projection conversion or the like is performed and the images are overlapped using a technique such as $\alpha$-blending, as a method to overwrite the canvas.

Figure 4:
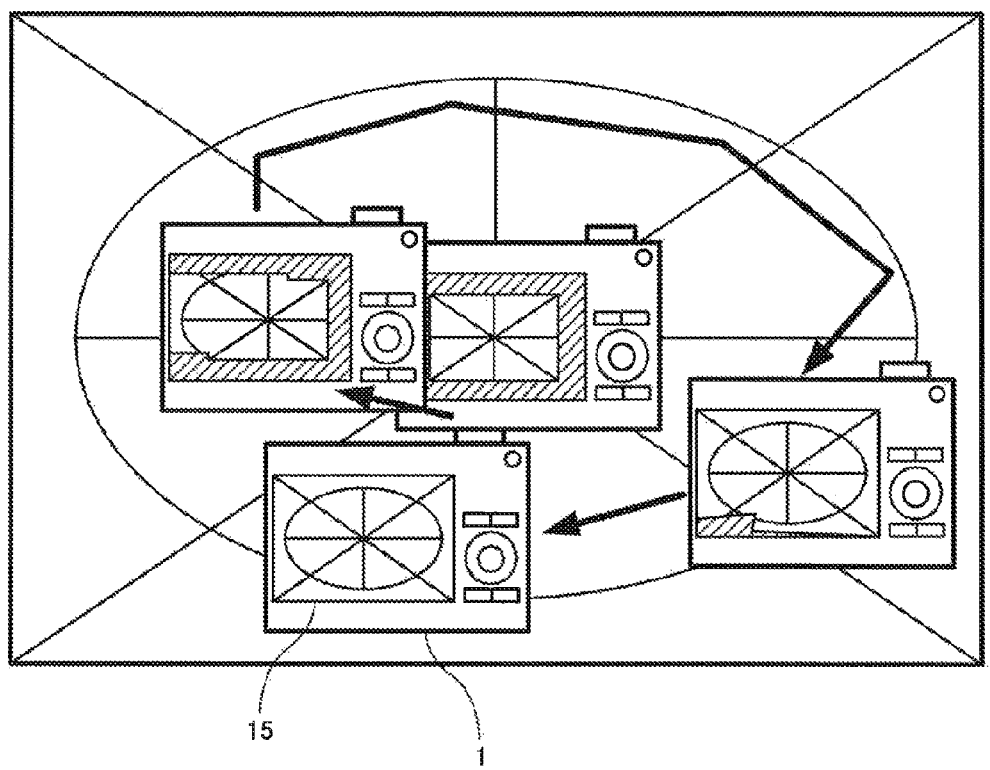
FIG. 4 is a schematic diagram for explaining user operation in the wide-angle imaging mode of the digital camera according to the embodiment.

FIG. 4 is a schematic diagram for explaining user operation in the wide-angle imaging mode of the digital camera 1 according to the embodiment. When capturing a desired landscape, the user, for example, moves the digital camera 1 in a circular motion while depressing (half-depression→full depression) the shutter SW towards the center area, as indicated by the arrow in FIG. 4. However, it is hard for the user to know how to move the digital camera 1 or whether or not necessary images are being taken without fail.

Therefore, in the embodiment, when the user depresses (half-depression→full depression) the shutter SW, a plurality of images are consecutively captured at a predetermined cycle (time interval) over a predetermined amount of time or for a predetermined number of images, as described above. Every time an image is captured, its reduced image (low resolution) is generated in real-time and combined with the reference image (or composite image) so as to be partially overlapped with each other, and the composite image is displayed on the image display section 15. At this time, the original image (high-quality image) of the reduced image used for the image composition is stored.

Then, when the imaging over a predetermined amount of time or for a predetermined number of images is completed, the original images (high-quality images) stored as described above are combined so as to be partially overlapped, as in the case of the image composition performed using the reduced image. As a result, an image with a wide viewing angle that cannot be acquired by a single shot is generated. In the embodiment, since combined reduced images are displayed on the image display section 15 during consecutive image capturing, the user can easily confirm a direction in which the digital camera should be pointed.

As described above, an image with a wide viewing angle is generated by a plurality of images being consecutively captured at a predetermined cycle (time interval) over a predetermined amount of time or for a predetermined number of images, and being combined so as to be partially overlapped. However, there is a possibility that an expected image covering the overall wide imaging angle may not be acquired. In other words, a blank area (uncaptured area) that has not been captured in the composite image may remain.

Therefore, in the embodiment, a trimming function is provided that detects whether or not there remains a blank area in an ultimately generated composite image and, when a blank area is detected, trims a portion of the composite image. An area excluding the blank area is trimmed from the composite image by the trimming function, and a new composite image is generated from the area, whereby an image with a wide viewing angle having no blank area is acquired.

As a method for detecting the blank area, for example, a method can be used in which data (such as 0: uncaptured) that ordinarily cannot be acquired as image data is written in advance in the overall canvas, and after a composite image is generated, the canvas is scanned, and judgment is made regarding whether or not an area in which the above-described data remains is present. If the judgment result is that an area in which the data remains is present, a judgment is made that there remains a blank area. In this case, whether or not to perform the trimming processing, the trimming size, the trimming area, etc. are selectable by the user.

B. Operations of the Embodiment

Next, operations of the above-described embodiment will be described.

FIG. 5 is a flowchart for explaining operations of the digital camera 1 according to the embodiment. FIG. 6A and FIG. 6B are schematic diagrams for explaining image composition in the wide-angle imaging mode of the digital camera 1 according to the embodiment. FIG. 7A to FIG. 7F are schematic diagrams showing display examples of the image display section 15 in the digital camera 1 according to the embodiment.

Note that, while the processing described hereafter is running, the digital camera 1 loads images formed in the CCD 5 at predetermined time intervals (several tens of frames per second) and displays the images on the image display section 15 in live view as preview images (low resolution).

Regarding the display position of a preview image on the image display section 15, in ordinary imaging, the center of the image display section 15 and the center of a preview image coincide (a photographic subject in an image capturing direction is displayed in the center of the image display section 15). However, in the wide-angle imaging mode of the embodiment, the position of a preview image on the screen of the image display section 15 is moved according to the image capturing direction of the digital camera 1, with reference to the image capturing position of the reference image.

For example, after capturing a reference image, when the user moves the image capturing direction of the digital camera 1 in the right-hand direction (relative to the reference image capturing position), the preview image of an image currently being captured also moves on the screen of the image display section 15, in the right-hand direction relative to the reference image. Conversely, when the user moves the image capturing direction in the left-hand direction, the preview image also moves in the left-hand direction relative to the reference image. The same applies to when the image capturing direction is moved in the upward or downward direction. Hereafter, the imaging and the generation of an image with a wide viewing angle will be described with the view of the positional control of a preview image such as this.

First, the CPU 11 judges whether or not the shutter SW has been half-depressed (Step S10). When judged that the shutter SW has not been half-depressed, the CPU 11 repeatedly performs Step S10. Conversely, when judged that the shutter SW has been half-depressed, the CPU 11 performs auto-focus (AF) processing (Step S12) and judges whether or not the shutter SW has been fully depressed (Step S14). When judged that the shutter SW has not been fully depressed, the CPU 11 repeatedly performs Step S10 and Step S12.

Figure 7A:
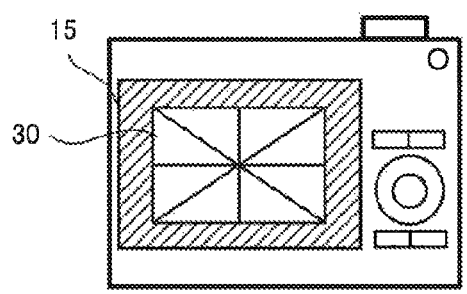
FIG. 7A to FIG. 7F are schematic diagrams showing display examples of an image display section in the digital camera according to the embodiment.

Conversely, when judged that the shutter SW has been fully depressed, the CPU 11 first captures a first image (high resolution) as a reference image and stores it in the DRAM 12 (Step S16). As shown in FIG. 7A, the CPU 11 displays a reduced image of the reference image 30 in the center of the image display section 15 (Step S18). Next, the CPU 11 loads a captured image, and generates its reduced image by performing reduction processing (pixel skipping) (Step S20).

Next, the CPU 11 calculates an overlap image position using the reduced image (Step S22). Note that the calculation of an overlap image position herein refers to, for example, a calculation in which the center position (coordinates) of a reduced image is calculated and, if the reference image (or composite image) is already present, the reduced image of the current frame and the reference image (or composite image) are positioned so as to be partially overlapped with each other, and the position of the reduced image of the current frame within the canvas is calculated.

Next, based on the center position of the reduced image and the position within the canvas, the CPU 11 judges whether or not the center position of the reduced image is within a processing area (within the canvas) (Step S24). When judged that the center position of the reduced image is within the processing area, the CPU 11 stores the loaded captured image (high resolution) as a usable image (Step S26) and overwrites the blank area that is an uncaptured area with the reduced image (Step S28).

That is, when the center position of the reduced image of the current frame is within the processing area, the reduced image of the current frame and the reference image (or composite image) are combined so as to be partially overlapped with each other, and the canvas 40 is overwritten with the composite image (when the captured image is a first captured image, the center portion of the canvas 40 is overwritten with the image as a reference image). In the example shown in FIG. 6A, since the center position of the reduced image 31 of the current frame is within the canvas 40, the CPU 11 combines the reduced image 31 of the current frame and a reference image 30 so that they are partially overlapped with each other, and overwrites the canvas 40 with the composite image 32. Then, the CPU 11 displays the composite image 32 on the image display section 15 (Step S30).

Figure 7B:
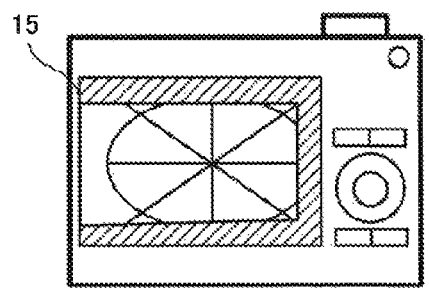
Figure 7C:
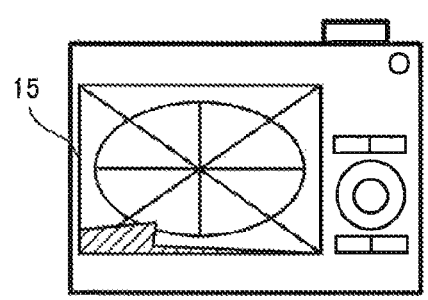

Next, the CPU 11 judges whether or not all necessary images have been acquired (for example, whether or not the number of images equivalent to a predetermined amount of time or a predetermined number of images has been acquired) (Step S32). When judged that not all necessary images have been acquired, the CPU 11 returns to Step S20 and repeats the same processing on the captured image of the next frame. As a result, every time an image is captured and the center position of the captured image is within the processing area, the image and the reference image (or composite image) are combined, and the composite image is displayed on the image display section 15, in sequential order, as shown in FIG. 7B and FIG. 7C.

Conversely, when the center position of the reduced image of the current frame is not within the processing area, the CPU 11 returns to Step S20, and repeats the same processing on the next captured image. For example, as shown in FIG. 6B, image composition is not performed when the center position of the reduced image 31 of the current frame is not within the canvas 40.

When all necessary images are acquired, the CPU 11 positions and combines the stored usable images that are the original images of the reduced images used for the image composition so that they are partially overlapped, as in the case of the image composition performed using the reduced images. Consequently, an image with a wide viewing angle such as that shown in FIG. 2 is generated (Step S34).

Figure 7D:
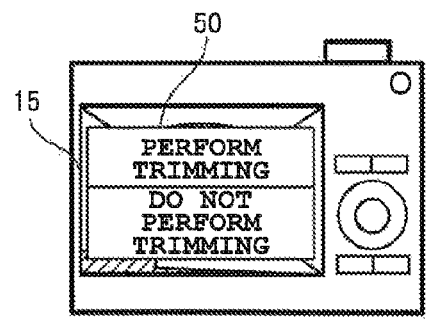

Next, the CPU 11 judges whether or not there is a blank area (uncaptured area) in the composite image (Step S36). When there is no blank area, the CPU 11 terminates the processing because trimming is not required to be performed. Conversely, when there is a blank area, the CPU 11 displays a selection screen 50 to prompt the user to select whether or not to perform trimming, as shown in FIG. 7D (Step S38). The selection screen 50 also serves as a notification to the user that there is a blank area in the composite image.

Figure 7E:
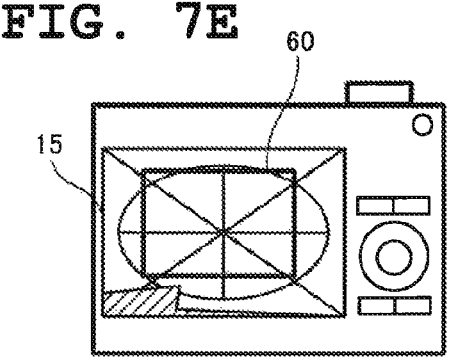
Figure 7F:
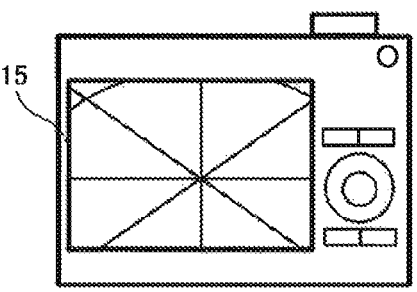

Next, the CPU 11 judges whether or not the user has given an instruction to perform trimming (Step S40). When judged that the user has given an instruction not to perform trimming, the CPU 11 terminates the processing without performing trimming. Conversely, when judged that the user has given an instruction to perform trimming, the CPU 11 displays a trimming frame 60 on the image display section 15 and prompts the user to specify a trimming range and the position, as shown in FIG. 7E (Step S42).

Note that the size (trimming range) and the position of the trimming frame 60 can be changed by the user operating the key inputting section 16. At this time, the aspect ratio of the trimming frame may match the aspect ratio of the image display section 15, may be an aspect ratio set in advance, or may be an aspect ratio set completely at the user's discretion.

When a trimming range and the position are specified, the CPU 11 trims the composite image in proportion to the trimming frame 60, and after storing the trimmed composite image in the DRAM 12 as the final composite image, displays the final composite image on the image display section 15 (Step S44).

At this time, the composite image before being trimmed may be kept, or the user may select whether to keep or delete the composite image before being trimmed. In the above-described processing, the trimming frame 60 is set by user operation and trimming is performed in proportion to the trimming frame 60. However, the processing is not limited thereto, and it may be performed such that a portion of a composite image which includes no blank area is automatically trimmed on the digital camera 1 side. Alternatively, the processing may be performed such that only whether or not to perform trimming is selected by the user and, when the user selects to perform trimming, a portion of the composite image which includes no blank area is automatically trimmed on the digital camera 1 side. Moreover, the processing may be performed such that a portion of a composite image which includes no blank area is automatically trimmed when there is a blank area in the composite image. In the processing where trimming is automatically performed, a portion whose size is the largest in portions including no blank area may be automatically trimmed. Furthermore, the CPU 11 may return to Step S10 when an instruction not to perform trimming is given by the user.

According to the above-described embodiment, whether or not there remains a blank area in a final composite image is judged and, if there is a blank area, the user is notified of the presence of the blank area by being prompted to select whether or not to perform trimming. Then, when trimming is performed, although the viewing angle becomes slightly smaller as a result of a portion of the composite image excluding the blank area being trimmed, the overall range of the viewing angle is captured, whereby a desired image with a wide viewing angle is acquired.

In addition, a plurality of images are consecutively captured at a predetermined cycle (time interval) and, every time an image is captured, its reduced image that has been combined with the reference image is displayed on the image display section 15 in real-time. As a result, the user can easily confirm directions that have not yet been captured and directions that have already been captured. Therefore, the user can easily know a direction in which the digital camera should be pointed next, whereby an image with a wide viewing angle can be easily and efficiently acquired.

Note that an acceleration sensor that detects the movement of the digital camera may be further included in the embodiment and, when images sequentially captured by consecutive image capturing are to be overlapped, the overlap image position may be calculated taking into consideration movement detected by the acceleration sensor. Moreover, in the embodiment, a digital camera is described as the imaging apparatus. However, the present invention is not limited thereto, and is applicable to any electronic device having an imaging function, such as a mobile phone. Furthermore, a configuration may be used in which the present invention is actualized by the CPU 11 running a predetermined program stored in a program memory (not shown).

While the present invention has been described with reference to the preferred embodiments, it is intended that the invention be not limited by any of the details of the description therein but includes all the embodiments which fall within the scope of the appended claims.

What is claimed is:

1. An imaging apparatus comprising:
   a capturing section which captures an image at a first viewing angle;
   a capturing control section which performs a plurality of image capturing operations by the capturing section;
   a generation section which generates a composite image reproducing an image captured at a second viewing angle that is wider than the first viewing angle by combining a plurality of images acquired by the plurality of image capturing operations by the capturing control section;
   a judgment section which judges whether or not an uncaptured area that has not been captured by the capturing control section exists within the composite image with the second viewing angle generated by the generation section;
   a trimming section which trims the composite image; and
   a notification section which notifies a user of a judgment result, when the judgment section judges that an uncaptured area exists, by displaying a notification prompting the user to select whether or not to perform trimming by the trimming section.

2. The imaging apparatus according to claim 1, further comprising:
   a specifying section which prompts the user to specify at least one of a trimming range and a trimming position for the trimming by the trimming section;
   wherein the trimming section trims the composite image based on the at least one of the trimming range and the trimming position specified by the user.

3. The imaging apparatus according to claim 1, wherein the trimming section trims an area that does not include the uncaptured area from the composite image, when the user selects to perform the trimming.

4. The imaging apparatus according to claim 3, wherein the trimming section trims an area having a largest size from among areas that do not include the uncaptured area from the composite image.

5. A non-transitory computer-readable storage medium having stored thereon a program that is executable by a computer in an imaging apparatus including a capturing section which captures an image at a first viewing angle, the program being executable by the computer to perform functions comprising:
   capturing control processing for performing a plurality of image capturing operations by the capturing section;
   generation processing for generating a composite image reproducing an image captured at a second viewing angle that is wider than the first viewing angle by combining a plurality of images acquired by the plurality of image capturing operations performed in the capturing control processing;
   judgment processing for judging whether or not an uncaptured area that has not been captured in the capturing control processing exists within the composite image with the second viewing angle generated in the generation processing;
   trimming processing for trimming the composite image; and
   notification processing for notifying a user of a judgment result, when the judgment processing judges that an uncaptured area exists, by displaying a notification prompting the user to select whether or not to perform the trimming processing.

\* \* \* \* \*